(12) United States Patent
Harmon et al.

(10) Patent No.: US 11,357,156 B2
(45) Date of Patent: Jun. 14, 2022

(54) SYSTEM AND METHOD FOR ADJUSTING THE SPACING BETWEEN GROUND ENGAGING TOOLS OF AN AGRICULTURAL IMPLEMENT

(71) Applicant: CNH Industrial America LLC, New Holland, PA (US)

(72) Inventors: Joshua David Harmon, Leola, PA (US); Trevor Stanhope, Palos Hills, IL (US)

(73) Assignee: CNH Industrial America LLC, New Holland, PA (US)

( * ) Notice: Subject to any disclaimer, the term of this patent is extended or adjusted under 35 U.S.C. 154(b) by 337 days.

(21) Appl. No.: 16/580,387

(22) Filed: Sep. 24, 2019

(65) Prior Publication Data

US 2021/0084803 A1    Mar. 25, 2021

(51) Int. Cl.
| | |
|---|---|
| *A01B 63/32* | (2006.01) |
| *A01B 15/16* | (2006.01) |
| *A01B 49/02* | (2006.01) |
| *A01B 13/14* | (2006.01) |
| *A01B 23/06* | (2006.01) |

(Continued)

(52) U.S. Cl.
CPC .............. *A01B 63/32* (2013.01); *A01B 15/16* (2013.01); *A01B 49/02* (2013.01); *A01B 13/14* (2013.01); *A01B 23/06* (2013.01); *A01B 61/046* (2013.01); *A01B 79/005* (2013.01)

(58) Field of Classification Search
CPC ......... A01B 63/32; A01B 15/16; A01B 49/02; A01B 13/14; A01B 23/06; A01B 61/046; A01B 79/005; A01B 19/02

USPC ......... 172/57, 137, 182, 185, 201, 571, 659, 172/660, 661
See application file for complete search history.

(56) References Cited

U.S. PATENT DOCUMENTS

| | | | | |
|---|---|---|---|---|
| 1,210,795 | A | * | 1/1917 | Hanson ................. A01B 19/02 172/611 |
| 2,324,065 | A | * | 7/1943 | Coffing ................. A01B 23/06 172/570 |

(Continued)

FOREIGN PATENT DOCUMENTS

GB        1601779 A     11/1981

OTHER PUBLICATIONS

International Search Report and Written Opinion Corresponding to Application No. PCT/US2020/052113 dated Jan. 14, 2021 (11 pages).

*Primary Examiner* — Tara Mayo-Pinnock
(74) *Attorney, Agent, or Firm* — Rebecca L. Henkel; Rickard K. DeMille

(57) ABSTRACT

A system for adjusting the spacing between ground engaging tools of an agricultural implement may include a plurality of ground engaging tools including a first end tool, a second end tool, and at least one intermediate tool positioned between the first and second end tools, with an adjustable ground engaging width being defined between the first and second end tools. The system may further include a biasing element positioned between each respective pair of adjacent engaging tools and configured to apply a biasing force against its respective pair of adjacent tools such that an inter-tool spacing between each respective pair of adjacent tools is maintained substantially uniform across the plurality of ground engaging tools as the ground engaging width is adjusted.

17 Claims, 9 Drawing Sheets

(51) Int. Cl.
*A01B 61/04* (2006.01)
*A01B 79/00* (2006.01)

(56) References Cited

U.S. PATENT DOCUMENTS

| | | |
|---|---|---|
| 3,833,067 A | 9/1974 | Peterson, Jr. et al. |
| 4,113,030 A | 9/1978 | Walker |
| 4,446,924 A | 5/1984 | Dietrich, Sr. |
| 5,507,351 A | 4/1996 | Martin |
| 5,709,271 A | 1/1998 | Bassett |
| 6,253,692 B1 | 7/2001 | Wendling et al. |
| 7,762,345 B2 | 7/2010 | Rozendaal et al. |
| 8,196,671 B2 | 6/2012 | Friestad |
| 9,485,900 B2 | 11/2016 | Connell et al. |
| 9,769,971 B2 | 9/2017 | Hesla |
| 2015/0053441 A1 | 2/2015 | Kovach et al. |
| 2015/0129262 A1 | 5/2015 | Kovach et al. |

\* cited by examiner

```
┌─────────────────────────────────────────────────────────────┐
│ RECEIVE AN INPUT ASSOCIATED WITH ADJUSTING AN INTER-TOOL SPACING │─ 302
│ DEFINED BETWEEN AT LEAST ONE PAIR OF GROUND ENGAGING TOOLS  │
│           OF A PLURALITY OF GROUND ENGAGING TOOLS           │
└─────────────────────────────────────────────────────────────┘
                              │
┌─────────────────────────────────────────────────────────────┐
│ ADJUST A GROUND ENGAGING WIDTH DEFINED BETWEEN FIRST AND SECOND END │
│ TOOLS OF THE PLURALITY OF GROUND ENGAGING TOOLS BASED ON THE RECEIVED │
│ INPUT SUCH THAT THE INTER-TOOL SPACING DEFINED BETWEEN EACH RESPECTIVE │─ 304
│ PAIR OF ADJACENT TOOLS OF THE PLURALITY OF GROUND ENGAGING TOOLS IS │
│ VARIED AT LEAST IN PART BY A BIASING FORCE OF THE PLURALITY OF │
│                       BIASING ELEMENTS                      │
└─────────────────────────────────────────────────────────────┘
```

```
┌─────────────────────────────────────────────────────────────┐
│  RECEIVE AN INPUT ASSOCIATED WITH MATERIAL ACCUMULATION RELATIVE  │── 402
│  TO AT LEAST ONE PAIR OF GROUND ENGAGING TOOLS OF A PLURALITY OF  │
│                    GROUND ENGAGING TOOLS                    │
└─────────────────────────────────────────────────────────────┘
                              │
┌─────────────────────────────────────────────────────────────┐
│  ADJUST A GROUND ENGAGING WIDTH DEFINED BETWEEN FIRST AND SECOND  │
│  END TOOLS OF THE PLURALITY OF GROUND ENGAGING TOOLS BASED ON THE │
│  RECEIVED INPUT SUCH THAT THE INTER-TOOL SPACING DEFINED BETWEEN EACH │── 404
│  RESPECTIVE PAIR OF ADJACENT TOOLS OF THE PLURALITY OF GROUND ENGAGING │
│  TOOLS IS VARIED AT LEAST IN PART BY A BIASING FORCE OF THE PLURALITY │
│                    OF BIASING ELEMENTS                      │
└─────────────────────────────────────────────────────────────┘
```

FIG. 9

SYSTEM AND METHOD FOR ADJUSTING THE SPACING BETWEEN GROUND ENGAGING TOOLS OF AN AGRICULTURAL IMPLEMENT

FIELD OF THE INVENTION

The present subject matter relates generally to agricultural implements, and more particularly, to a system and associated method for adjusting the spacing between ground engaging tools of an agricultural implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more ground engaging tools configured to engage the soil as the implement is moved across the field. For example, in certain configurations, the implement may include one or more harrow disks, leveling disks, rolling baskets, shanks, tines, and/or the like. Such ground engaging tool(s) loosen and/or otherwise agitate the soil to prepare the field for subsequent planting operations.

During tillage operations, adjacent ground engaging tools are spaced apart by a distance, which is typically selected based on a type of soil, type of residue, and/or a type of seed to be subsequently planted within the field to best condition the field for subsequent operations, e.g., a planting operation. In the case of ganged disks, the spacing between adjacent disks is set by positioning one or more spacers or spindles extending along a set length of the shaft between adjacent ones of the ganged disks. However, to alter the tool spacing between the disks, the spacers must be replaced with spacers of different lengths, which may be time consuming.

Further, during an agricultural operation, field materials, such as residue, soil, rocks, and/or the like, may become trapped or otherwise accumulate between adjacent ground engaging tools, particularly between disk blades of disk gangs. Such accumulation of field materials may inhibit the operation of the disk blades in a manner that prevents the disk blades from providing adequate tillage to the field. In such instances, it is necessary for the operator to take certain corrective actions to remove the material accumulation. However, it may be time consuming for the tillage implement operator to manually remove the material accumulation between the disk blades.

Accordingly, an improved system for adjusting the spacing between ground engaging tools of an agricultural implement and a related method would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for adjusting the spacing between ground engaging tools of an agricultural implement. The system includes a plurality of ground engaging tools configured to rotate relative to and engage soil within a field as an agricultural implement is moved across the field. The plurality of ground engaging tools includes a first end tool, a second end tool, and at least one intermediate tool positioned between the first and second end tools, where an adjustable ground engaging width is defined between the first and second end tools. The system further includes a plurality of biasing elements, each biasing element of the plurality of biasing elements being positioned between a respective pair of adjacent tools of the plurality of ground engaging tools. Each biasing element is configured to apply a biasing force against its respective pair of adjacent tools such that an inter-tool spacing between each respective pair of adjacent tools is maintained substantially uniform across the plurality of ground engaging tools as the ground engaging width is adjusted. The system further includes an actuator configured to actuate the first end tool relative to the second end tool between a first tool position and a second tool position.

In some aspects, the present subject matter is directed to an agricultural implement. The agricultural implement includes a frame member, a rotating shaft supported relative to the frame member, and a plurality of disks ganged on the rotating shaft and configured to rotate relative to and engage soil within afield as the agricultural implement is moved across the field. The plurality of disks includes a first end disk, a second end disk, and at least one intermediate disk positioned axially between the first and second end disks, with an adjustable disk gang width being defined between the first and second end disks. Additionally, the implement includes a plurality of biasing elements, with each biasing element of the plurality of biasing elements being positioned between a respective pair of adjacent disks of the plurality of disks. Each biasing element is configured to apply a biasing force against its respective pair of adjacent disks such that an inter-disk spacing defined between each respective pair of adjacent disks is maintained substantially uniform across the plurality of disks as the disk gang width is adjusted.

Moreover, in some aspects, the present subject matter is directed to a method for adjusting the spacing between ground engaging tools of an agricultural implement. The agricultural implement has a plurality of ground engaging tools including a first end tool, a second end tool, and at least one intermediate tool positioned between the first and second end tools. The agricultural implement further has a plurality of biasing elements, where each biasing element of the plurality of biasing elements is positioned between and configured to apply a biasing force against a respective pair of adjacent ground engaging tools of the plurality of ground engaging tools. The method includes receiving, with a computing device, an input associated with adjusting an inter-tool spacing defined between at least one pair of ground engaging tools of the plurality of ground engaging tools. The method further includes adjusting, with the computing device, a ground engaging width defined between the first and second end tools based on the received input such that the inter-tool spacing defined between each respective pair of adjacent tools of the plurality of ground engaging tools is varied at least in part by the biasing force of the plurality of biasing elements.

Additionally, in some aspects, the present subject matter is directed to a method for managing material accumulation relative to ground engaging tools of an agricultural implement. The agricultural implement has a plurality of ground engaging tools including a first end tool, a second end tool, and at least one intermediate tool positioned between the first and second end tools. The agricultural implement further has a plurality of biasing elements, with each biasing element of the plurality of biasing elements being positioned between and configured to apply a biasing force against a respective pair of adjacent ground engaging tools of the plurality of ground engaging tools. The method includes receiving, with a computing device, an input associated with material accumulation relative to at least one pair of ground engaging tools of the plurality of ground engaging tools. Additionally, the method includes adjusting, with the computing device, a ground engaging width defined between the first and second end tools based on the received input such that an inter-tool spacing defined between each respective pair of adjacent tools of the plurality of ground engaging tools is varied at least in part by the biasing force of the plurality of biasing elements.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 8 illustrates a flow diagram of one embodiment of a method for adjusting the spacing between ground engaging tools of a ground engaging assembly of an agricultural implement in accordance with aspects of the present subject matter; and FIG. 9 illustrates a flow diagram of one embodiment of a method for managing material accumulation relative to a ground engaging assembly of an agricultural implement in accordance with aspects of the present subject matter.

Figure 1:
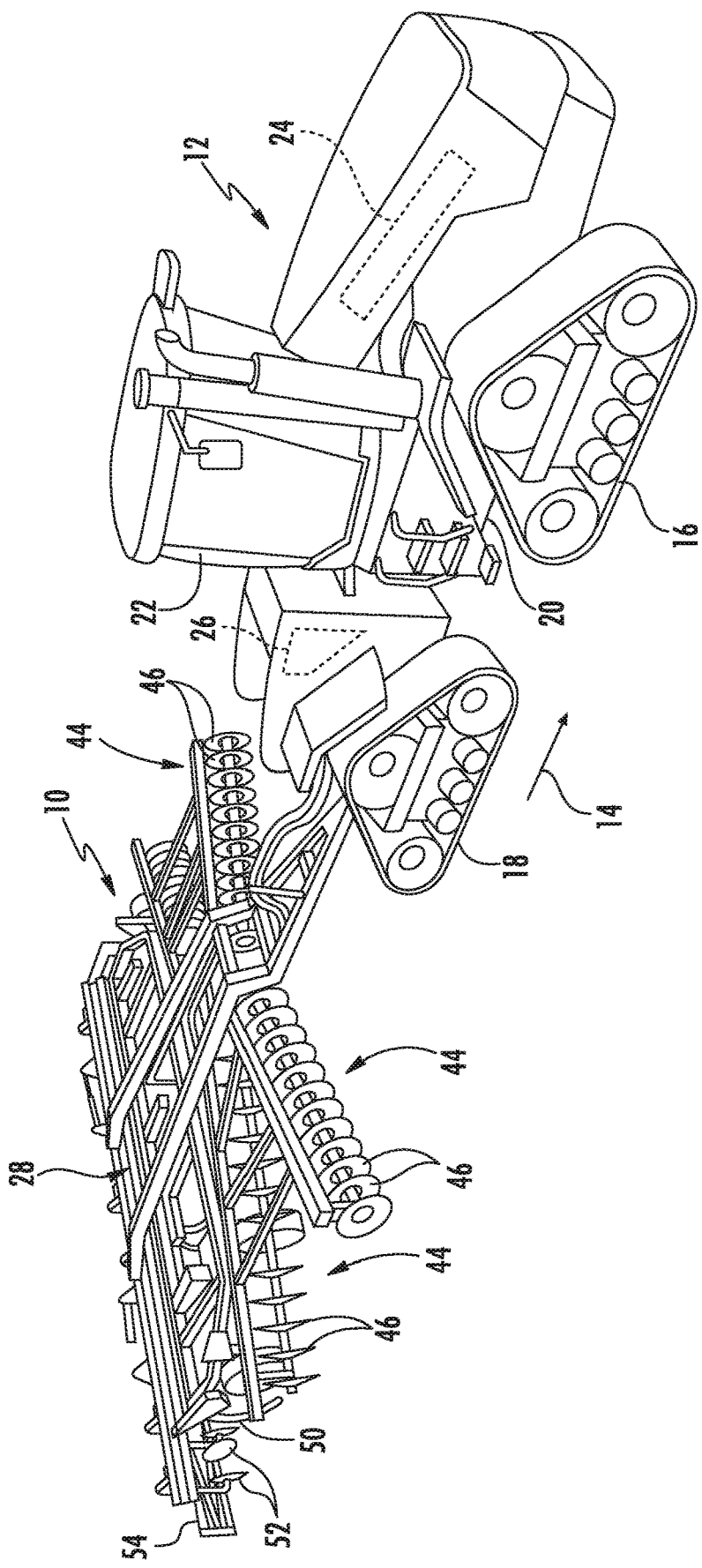
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for adjusting the spacing between ground engaging tools of a ground engaging assembly of an agricultural implement, such as a disk gang of a tillage implement. In particular, the ground engaging assembly (e.g., disk gang) includes a first end tool, a second end tool, and at least one intermediate tool between the first and second end tools, with adjacent tools being spaced apart along a disk gang shaft by a given inter-tool spacing. A system may be provided in operative association with the ground engaging assembly to assist in adjusting the inter-tool spacing between the tools of the ground engaging assembly. More particularly, the system includes a spring positioned between each respective pair of adjacent ground engaging tools of the tool assembly such that each spring applies a biasing force against its respective pair of adjacent ground engaging tools. The inter-tool spacing defined between each respective pair of adjacent ground engaging tools is thus kept substantially even across the entire, adjustable ground engaging width defined between the first and second end tools.

In several embodiments, a controller of the disclosed system may be configured to receive an input associated with adjusting the inter-tool spacing. For example, in one embodiment, the input may be indicative of a user input directly requesting an adjustment of the inter-tool spacing, and/or may be indicative of a change in crop residue type or seed type. In response to the input, the controller may be configured to control the operation of the system provided in operative association with the tool assembly to adjust the inter-tool spacing between the tools. For instance, the controller may automatically control the operation of an actuator to actuate the first end tool relative to the second end tool to adjust the ground engaging width, and therefore the inter-tool spacing. In some embodiments, the actuator is configured to directly actuate the first end tool relative to the second end tool. In other embodiments, the actuator may indirectly actuate the first end tool relative to the second end tool, such as by compressing or expanding an end biasing element applying a biasing force against the first end tool relative to an end of the ground engaging assembly.

The present subject matter may also be directed to systems and methods for managing material accumulation relative to ground engaging tools of an agricultural implement. For example, in some embodiments, a controller of the disclosed system may be configured to receive an input associated with field material accumulation or "plugging" between at least one pair of adjacent tools of the ground engaging assembly. In such embodiments, the controller may control the operation of the actuator to adjust the inter-tool spacing as described above in an attempt to reduce material accumulation relative to the tools of the ground engaging assembly.

Figure 2:
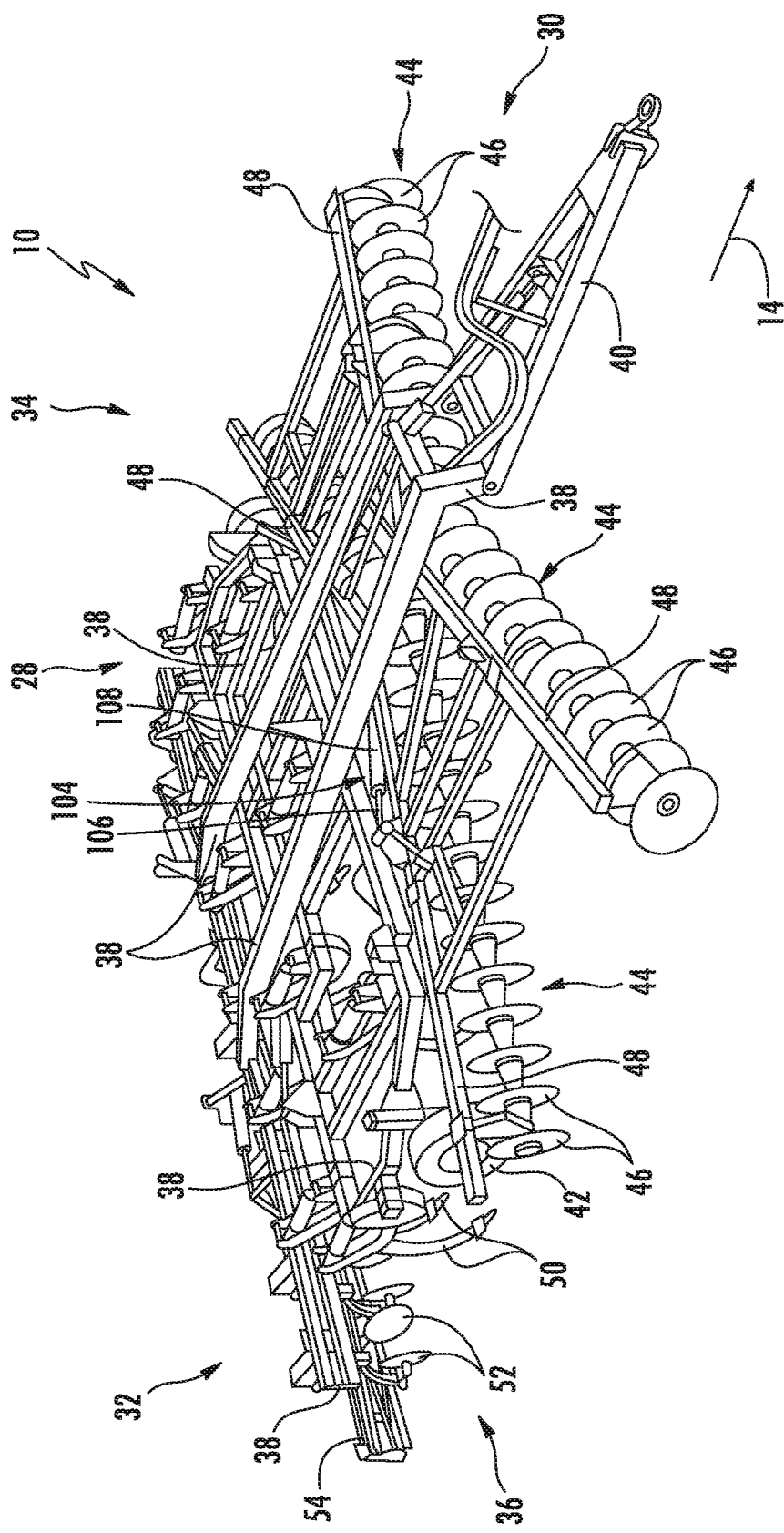
FIG. 2 illustrates an alternative perspective view of an agricultural implement in accordance with aspects of the present subject matter, particularly illustrating various ground engaging assemblies of the implement.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16 (only one of which is shown), a pair of rear track assemblies 18 (only one of which is shown), and a frame or chassis 20 coupled to and supported by the track assemblies 16, 18. An operator's cab 22 may be supported by a portion of the chassis 20 and may house various input devices (e.g., a user interface 260 shown in FIG. 7) for permitting an operator to control the operation of one or more components of the work vehicle 12 and/or one or more components of the implement 10. Additionally, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown) may be coupled to the frame 28 to facilitate towing the implement 10 in the direction of travel 14.

In several embodiments, the frame 28 may be configured to support one or more gangs or sets 44 of disk blades 46. Each disk blade 46 may, in turn, be configured to penetrate into or otherwise engage the soil as the implement 10 is being pulled through the field. In this regard, the various disk gangs 44 may be oriented at an angle relative to the direction of travel 14 to promote more effective tilling of the soil. In the embodiment shown in FIGS. 1 and 2, the implement 10 includes four disk gangs 44 supported on the frame 28 adjacent to its forward end 30. However, in alternative embodiments, the implement 10 may include any other suitable number of disk gangs 44, such as more or fewer than four disk gangs 44. Furthermore, in one embodiment, the disk gangs 44 may be mounted to the frame 28 at any other suitable location, such as adjacent to its aft end 32.

Moreover, in several embodiments, the implement 10 may include a plurality of disk gang actuators 104 (FIG. 2), with each actuator 104 being configured to move or otherwise adjust the orientation or position of one of the disk gangs 44 relative to the implement frame 28. For example, as shown in the illustrated embodiment, a first end of each actuator 104 (e.g., a rod 106 of the actuator 104) may be coupled to a support arm 48 of the corresponding disk gang 44, while a second end of each actuator 104 (e.g., the cylinder 108 of the actuator 104) may be coupled to the frame 28. The rod 106 of each actuator 104 may be configured to extend and/or retract relative to the corresponding cylinder 108 to adjust the angle of the corresponding disk gang 44 relative to a lateral centerline (not shown) of the frame 28 and/or the penetration depth of the associated disk blades 46. In the illustrated embodiment, each actuator 104 corresponds to a fluid-driven actuator, such as a hydraulic or pneumatic cylinder. However, each actuator 104 may correspond to any other suitable type of actuator, such as an electric linear actuator.

Additionally, as shown, in one embodiment, the implement frame 28 may be configured to support other ground engaging tools. For instance, in the illustrated embodiment, the frame 28 is configured to support a plurality of shanks 50 or tines (not shown) configured to rip or otherwise till the soil as the implement 10 is towed across the field. Furthermore, in the illustrated embodiment, the frame 28 is also configured to support a plurality of leveling blades or disks 52 and rolling (or crumbler) basket assemblies 54. It should be appreciated that any other suitable ground-engaging tools may be coupled to and supported by the implement frame 28, such as a plurality closing disks.

It should also be appreciated that the configuration of the implement 10 and work vehicle 12 described above are provided only to place the present subject matter in an exemplary field of use. Thus, it should be appreciated that the present subject matter may be readily adaptable to any manner of implement or work vehicle configurations.

Figure 3:
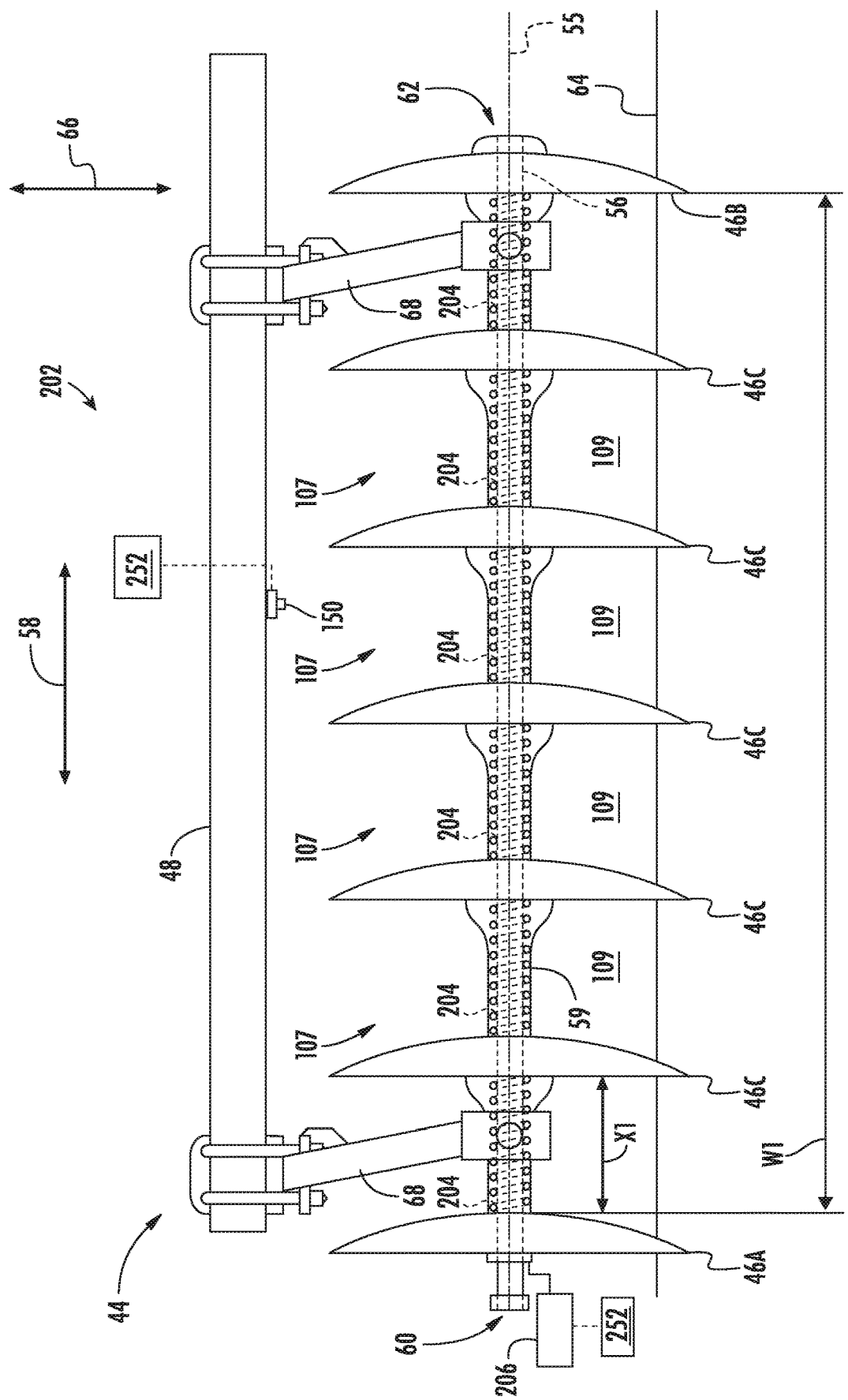
FIG. 3 illustrates a front view of one embodiment of a ground engaging assembly of an agricultural implement in accordance with aspects of the present subject matter, particularly illustrating components of one embodiment of a system for adjusting the spacing between ground engaging tools of the ground engaging assembly, with the ground engaging assembly in a minimum spacing position.
Figure 4:
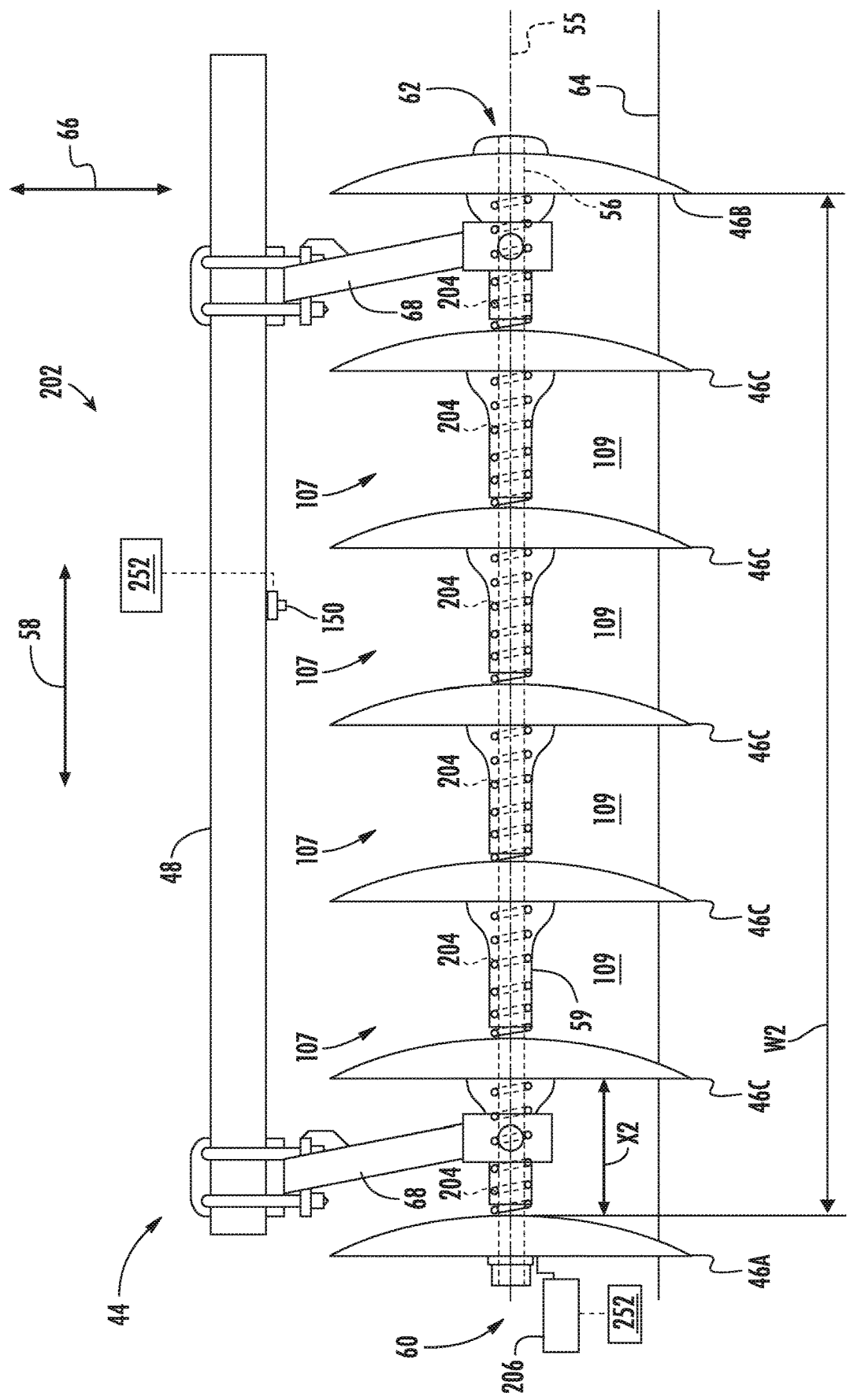
FIG. 4 illustrates another front view of the ground engaging assembly and system shown in FIG. 3 in accordance with aspects of the present subject matter, particularly illustrating the ground engaging assembly in a maximum spacing position.
Figure 5:
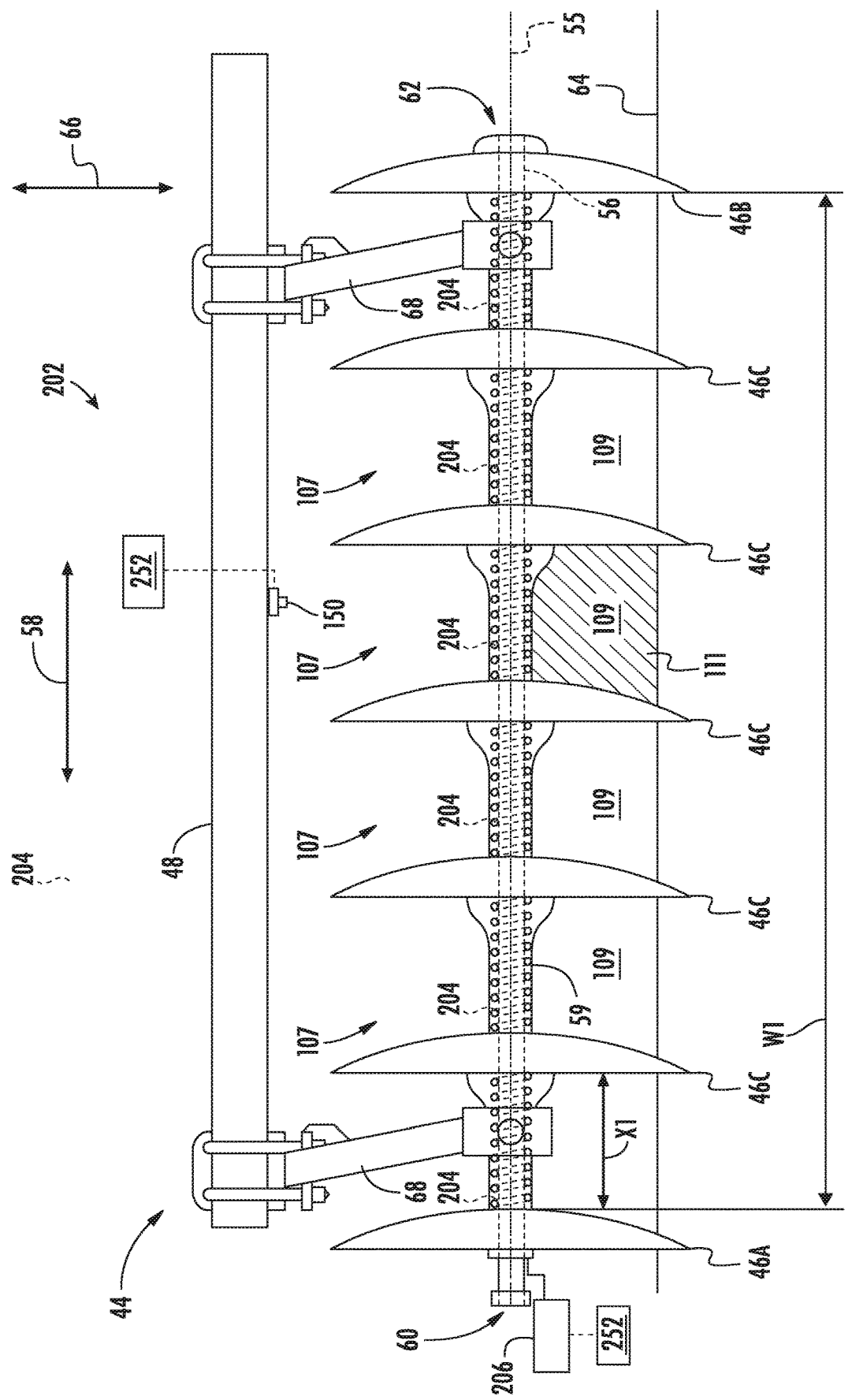
FIG. 5 illustrates another front view of the ground engaging assembly and system shown in FIG. 3 in accordance with aspects of the present subject matter, particularly illustrating the presence of material accumulation relative to the ground engaging assembly.

Referring now to FIGS. 3-5, various views of one embodiment of a ground engaging assembly (e.g., one of the disk gangs 44 shown in FIGS. 1 and 2) are illustrated in accordance with aspects of the present subject matter. More particularly, FIG. 3 illustrates a front view of one of the disk gangs 44 described above with reference to FIGS. 1 and 2, particularly illustrating components of one embodiment of a system for adjusting the inter-tool spacing defined between adjacent tools of the disk gang 44 installed relative thereto, particularly illustrating the disk gang 44 while an end disk of the disc gang 44 is at its minimum spacing position. FIG. 4 illustrates a further front view of the disk gang 44 shown in FIG. 3, particularly illustrating the disk gang 44 after the end disk of the disk gang 44 has been moved into its maximum spacing position by the system. FIG. 5 illustrates another front view of the disk gang 44 and system shown in FIG. 3, particularly illustrating a plugging condition of the disk gang 44.

As shown in FIG. 3, the disk gang 44 may include a disk gang shaft (e.g., as indicated with dashed lines 56) that extends along an axial direction of the disk gang 44 (e.g., as indicated by arrow 58) between a first end 60 and a second end 62. The disk gang shaft 56 may be positioned below the support arm 48 of the disk gang 44 along a vertical direction (e.g., as indicated by arrow 66) of the implement 10 and supported relative to the support arm 48 by one or more hangers 68. However, in alternative embodiments, the disk gang shaft 56 may have any other suitable orientation relative to the support arm 48.

The disk gang shaft 56 defines a rotational axis (e.g., as indicated by dashed line 55). The disk blades 46 of the disk gang 44 may be rotatably coupled or keyed to the disk gang shaft 56 such that the disk blades 46 rotate together with the disk gang shaft 56 about the rotational axis 55. The disk blades 46 generally include a first end disk 46A, a second end disk 46B, and at least one intermediate disk (e.g., a plurality of intermediate disks 46C) positioned between the first and second end disks 46A, 46B. The first end disk 46A is generally positioned closest to the first end 60 of the disk gang shaft 56 and the second end disk 46B is positioned closest to the second end 62 of the disk gang shaft 56. The first and second end disks 46A, 46B are spaced apart along the disk gang shaft 56 by a disk gang width W, with the disk blades 46 being slidably or movably coupled to the disk gang shaft 56 such that the disk blades 46 are movable relative to the disk gang shaft 56 to adjust the disk gang width W. An inter-disk spacing X defined between adjacent pairs of the disk blades 46 is also adjustable, as will be described in greater detail below.

In accordance with aspects of the present subject matter, one or more components of the disclosed system 202 may be associated with the disk gang 44 for adjusting the overall disk gang width W of the disk gang 44 and the associated inter-disk spacing X defined between adjacent ones of the disk blades 46 of the disk gang 44. In several embodiments the system 202 may include a biasing element 204 positioned between each pair of adjacent disk blades 46. In general, the biasing elements 204 may be configured to evenly bias the disk blades 46 along the gang shaft 56 such that the inter-disk spacing X defined between the disk blades 46 is maintained substantially uniform across the entire disk gang width W as the overall gang width W is being adjusted. As such, adjustment of the disk gang width W generally causes a respective adjustment in the inter-disk spacing X. In one embodiment, the biasing element(s) 204 are configured as springs positioned radially between a respective one of the spools 59 and the rotational shaft 56 such that the biasing elements 204 are substantially protected from field materials. However, the biasing elements 204 may be configured as any other suitable element, such as a compressible, elastic material and/or may be positioned at any other suitable location relative to the adjacent disk blades 46, for instance at a location radially outside of the spools 59.

The system 202 may further include a tool spacing actuator 206 (hereafter referred to as "actuator 206") configured to adjust the disk gang width W and, thus, the inter-disk spacing X between the disk blades 46. The actuator 206 may be communicatively coupled to and controlled by a controller 252 as will be described in greater detail below. More particularly, in one embodiment, the actuator 206 is configured to actuate the first end disk 46A relative to the second end disk 46B to adjust the disk gang width W. In general, the second end disk 46B may be fixed or otherwise held in a fixed position relative to the disk gang shaft 56 such that the first end disk 46A is movable relative to the second end disk 46B. In one embodiment, the actuator 206 is directly coupled to the first end disk 46A such that the actuator 206 may directly actuate the first end disk 46A relative to the second end disk 46B. However, in another embodiment, as will be described below, the actuator 206 may indirectly actuate the first end disk 46A relative to the second end disk 46B. The actuator 206 may be configured as any suitable actuator capable of actuating the first end disk 46A. For instance, in one embodiment, the actuator 206 may be configured as a linear actuator, such as a pneumatic or fluid driven actuator. In other embodiments, the actuator 206 may be configured as a screw-drive actuator, a worm-drive actuator, and/or the like.

The actuator 206 may be controlled to move the first end disk 46A to a minimum spacing position associated with a minimum disk gang width W1 (FIG. 3), a maximum spacing position associated with a maximum disk gang width W2 (FIG. 4), or any position therebetween. As the first end disk 46A is moved by the actuator 206, the biasing elements 204 function to keep the inter-tool spacing X uniform across the disk gang width W between adjacent pairs of disk blades 46 as the disk gang width W is increased or decreased, depending on the direction of movement of the first end disk 46A.

It should be appreciated that, in other embodiments, the actuator 206 may alternatively be configured to actuate the second end disk 46B relative to the first end disk 46A, or that a second actuator may be provided in connection with the second end disk 46B for actuating the second end disk 46B relative to the first end disk 46A.

When the first end disk 46A is in its minimum spacing position, as shown in FIG. 3, each disk blade 46 may be spaced apart from an adjacent disk blade 46 along the minimum disk gang width W1 by a first inter-disk spacing X1 in the axial direction 58, with an open space 107 being defined between each pair of adjacent disk blades 46 in the axial direction 58. The first inter-disk spacing X1 may generally be selected based on the desired performance and or operating conditions of the implement 10.

In some embodiments, spools 59 are positioned between adjacent disk blades 46. In such embodiments, the axial length of each spool 59 along the rotational shaft 56 defines the first inter-disk spacing X1. However, it should be appreciated that, in other embodiments, the spools 59 may not be included, such that the first inter-disk spacing X1 may correspond to any suitable distance.

When the first end disk 46A is in its maximum spacing position, as shown in FIG. 4, each disk blade 46 may be spaced apart from an adjacent disk blade 46 along the maximum disk gang width W2 by a second inter-disk spacing X2 in the axial direction 58. In the embodiment shown, the disk gang width W is increased from the minimum disk gang width W1 to a maximum disk gang width W2. As a result, the inter-disk spacing X also increases from the first inter-disk spacing X1 (FIG. 3) to the second inter-disk spacing X2 (FIG. 4).

During, or prior to, a tillage operation of the implement 10, the actuator 206 may be controlled such that the first end disk 46A is moved into its minimum spacing position, which generally causes the remaining disk blades 46 to also move into their first or minimum spacing positions. More particularly, in one embodiment, each biasing element 204 is configured to bias the respective pair of disk blades 46 away from their minimum spacing positions. In such embodiment, the actuator 206 may be configured to apply a biasing force against the spring force of the biasing elements 204 such that the first end disk 46A is moved into its minimum spacing position. The force of the actuator 206 is substantially evenly applied across the entire disk gang width W1 via the biasing elements 204 such that the disk blades 46 are evenly spaced apart by the first inter-disk spacing X1 when in their respective minimum spacing positions. In some embodiments, the actuator 206 may continuously apply a biasing force to the disks 46 during a tillage operation of the implement 10 to hold the disks 46 in their minimum spacing positions. However, in other embodiments, a locking element may be engaged once the disk blades 46 are in their minimum spacing positions such that the actuator 206 may be de-energized during operation of the implement 10.

In other embodiments, each biasing element 204 may instead be configured such that the disk blades 46 are normally in their minimum spacing positions such that the actuator 206 may not need to apply a biasing force against the spring force of the biasing elements 204 to move the disk blades 46 into their minimum spacing positions. It should further be appreciated that each biasing element 204 may be configured to bias the respective pair of disk blades 46 away from each other or towards each other.

Upon receipt of an input indicative of a request to change or adjust the inter-disk spacing X between the disk blades 46, the operation of the actuator 206 is controlled such that the disk blades 46 are moved from their minimum spacing positions, e.g., towards their second or maximum spacing positions. Specifically, the actuator 206 is controlled to actuate the first end disk 46A between its minimum spacing position shown in FIG. 3 and its maximum spacing position shown in FIG. 4. For instance, when the biasing elements 204 are configured to bias the disk blades 46 away from their minimum spacing positions such that the actuator moves the first end disk 46A into its minimum spacing position, the actuating force of the actuator 206 may be reduced or applied in the opposite direction such that the disk blades 46 are moved out of their minimum spacing positions towards their maximum spacing positions. Alternatively, when the biasing elements 204 are configured such that the disk blades 46 are normally in their minimum spacing positions, the actuator 206 may be configured to actuate the first end disk 46A such that the disk blades 46 move out of their minimum spacing positions towards their maximum spacing positions.

In some embodiments, the input indicative of a request to adjust the inter-disk spacing X may be based on operator input (e.g., the operator may provide an input to adjust the disk gang width W and, thus, the inter-tool spacing X via a user interface 260). In other embodiments, the input indicative of a request to adjust the inter-disk spacing X may be based on input(s) from sensor(s), such as from material accumulation sensors (as will be described below) and/or sensors configured to monitor the output or effectiveness of the implement during the performance of an agricultural operation. In such embodiment, the actuator 206 may be automatically controlled based on the sensor input(s).

In one embodiment, the system 202 may also be configured to manage material accumulation relative to a ground engaging assembly of the implement 10. Particularly, as indicated above, in one embodiment, the input indicative of a request to adjust the inter-disk spacing X may be indicative of a plugging condition of at least one pair of adjacent disk blades 46 of the disk gang 44. Specifically, as the implement 10 is moved across a field, the disk blades 46 may be configured to penetrate the soil surface (e.g., as indicated by line 64) of the field and rotate about the rotational axis 55 relative to the soil within the field such that field materials flow through the open spaces 107. During normal, non-plugged operation of the disk gang 44, substantially all of the field materials being processed by the disk gang 44 flow through the open spaces 107, particularly through portion(s) of open spaces 107 defined below the rotational axis 55 (i.e., through lower flow zone(s) 109), with only an occasional piece of residue, dirt clod, rock, and/or the like flowing above the disk gang shaft 56.

In certain instances, however, a plugging condition may occur in which field materials accumulate within the flow zone(s) 109. For example, when the soil in the field has high moisture content, the soil may stick or adhere to the disk blades 46 such that the soil accumulates within the associated flow zone(s) 109. Moreover, a large chunk of residue or a rock may become lodged between a pair of adjacent disk blades 46 in a manner that inhibits the flow of field materials through the associated flow zone(s) 109, thereby causing additional field materials to accumulate therein. As such, the disk blades 46 may become plugged and not perform as intended. For example, FIG. 5 illustrates a front view of the disk gang 44 and system 202 described with reference to FIG. 3 while the disk gang 44 is experiencing a plugging condition in which excessive material accumulation 111 has built up within one of the flow zones 109.

In some embodiments, the system 202 may include one or more material accumulation sensors 150 provided in operative association with the implement 10 for detecting such material accumulation. Generally, the material accumulation sensor(s) 150 may be configured to detect a parameter associated with plugging of the disk blades 46. For example, in one embodiment, the material accumulation sensor(s) 150 may be configured as a vision sensor(s). However, in alternative embodiments, the material accumulation sensor(s) 150 may be configured as any other suitable device for sensing or detecting plugging of the disk blades 46, such as a contact-based sensing device configured to engage or contact the soil as the implement 10 is towed across the field and/or a rotation sensor configured to detect the rotational speed of the disk gang shaft 56. The material accumulation sensor(s) 150 may be configured to transmit the data to the controller 252 for subsequent processing and/or analysis. For example, the data from the sensor(s) 150 may be compared to one or more thresholds, above which it can be inferred that plugging is likely occurring. Additionally or alternatively, in some embodiments the controller 252 may be configured to receive an input from an operator indicative of plugging of the disk gang 44.

Upon detection of material accumulation relative to the disk blades 46, the operation of the actuator 206 is controlled such that the disk blades 46 are moved towards their maximum spacing positions. Specifically, the actuator 206 is controlled to actuate the first end disk 46A between its minimum spacing position shown in FIGS. 3 and 5 towards its maximum spacing position shown in FIG. 4. As a result, the inter-disk spacing X increases from the first inter-disk spacing X1 (FIGS. 3 and 5) to a maximum inter-disk spacing X2 (FIG. 4), which may help the material accumulation fall from the disk gang 44. It should be appreciated that, in some embodiments, the actuator 206 may instead be configured to actuate the first end disk 46A such that the disk gang width W and the inter-disk spacing X decrease from the minimum disk gang width W1 and the first inter-disk spacing X1, respectively, to help reduce the material accumulation formed relative to the disk gang 44.

Figure 6:
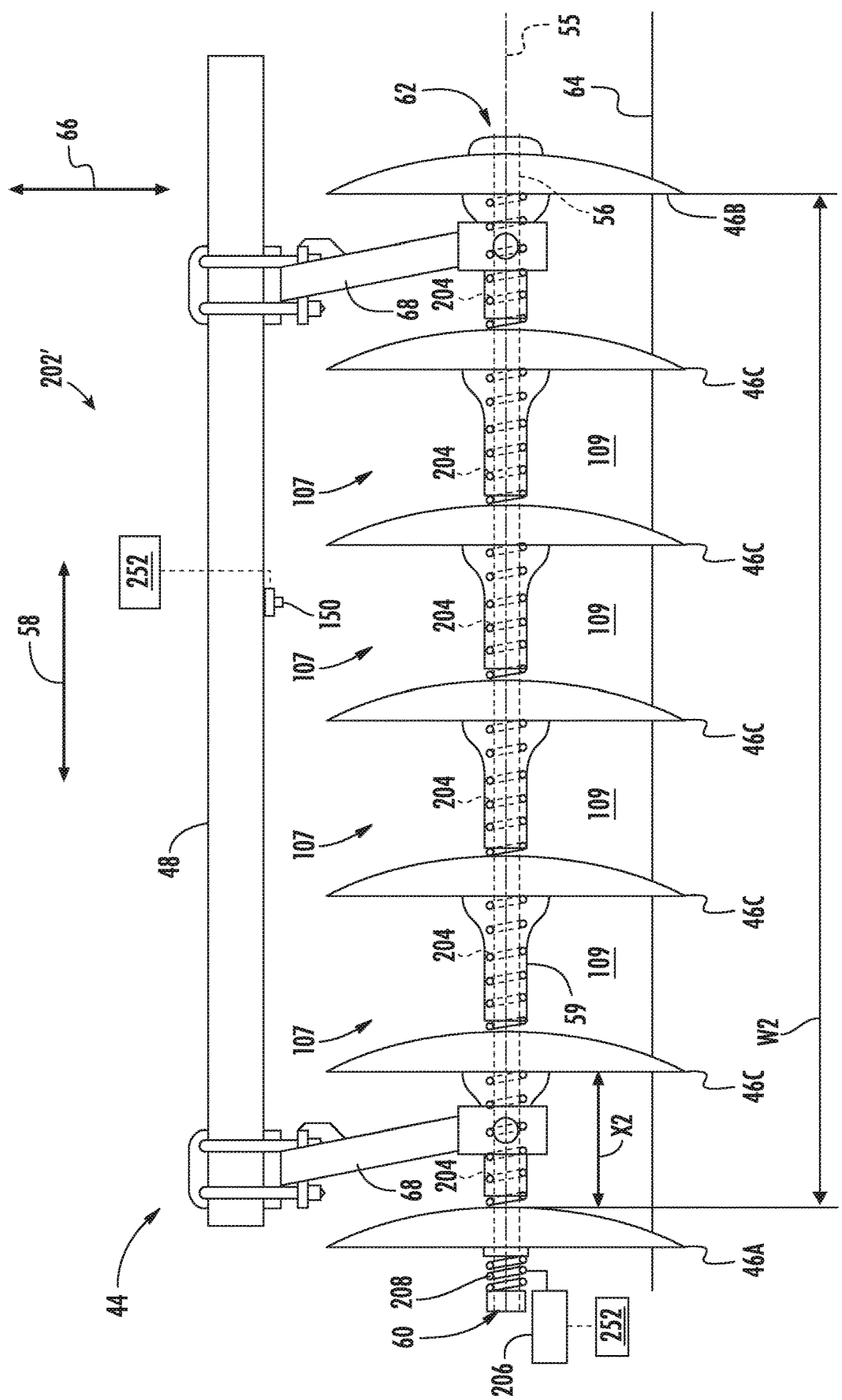
FIG. 6 illustrates a further front view of the ground engaging assembly shown in FIG. 3, particularly illustrating another embodiment of a system for adjusting the spacing between ground engaging tools of the ground engaging assembly in accordance with aspects of the present subject matter.

Referring now to FIG. 6, exemplary views of a variation of the system 202 described above with reference to FIG. 3 is illustrated in accordance with aspects of the present subject matter. Particularly, in the embodiment shown, a system 202' is provided relative to the disk gang 44, with the system 202' being configured substantially similar to the system 202 except that the system 202' includes an end biasing element 208. The end biasing element 208 is positioned between the first end 60 of the disk gang shaft 56 and the first end disk 46A and is configured to apply a biasing force against the first end of the disk gang shaft 56 and the first end disk 46A. In such embodiments, the actuator 206 may be coupled to the end biasing element 208, instead of the first end disk 46A, such that compression or expansion of the end biasing element 208 causes displacement of the first end disk 46A. The end biasing element 208 may be configured as any suitable biasing element, similar to the biasing elements 204 described above. For instance, in one embodiment the end biasing element 208 is configured as one of a helical spring, a compressible, elastic material, and or the like. In one embodiment, the end biasing element 208 may be configured to bias the first end disk 46A into its minimum spacing position. In other embodiments, the end biasing element 208 may be configured to bias the first end disk 46A away from its minimum spacing position. It should be appreciated that the end biasing element 208 may instead be positioned between the second end disk 46B and the second end 62 of the disk gang shaft 56 such that the second end disk 46B is actuatable relative to the first end disk 46A.

It should further be appreciated that, while the system 202, 202' has generally been described herein with reference to adjusting the inter-disk spacing X between adjacent disks 46 of a disk gang 44 of a tillage implement 10, the system 202, 202' may be configured to be associated with any other ground engaging tools or ground engaging assemblies of any suitable agricultural implement. Further, it should be appreciated that the disclosed system 202, 202' may be used to adjust the inter-disk spacing X based on any other suitable condition besides material accumulation, such as residue type or soil type within the field, and/or an alignment of tools between forward and rear ground engaging assemblies, to optimize the performance of the disk gang 44 without requiring changing the spools 49 or otherwise manually adjusting the inter-disk spacing X.

Figure 7:
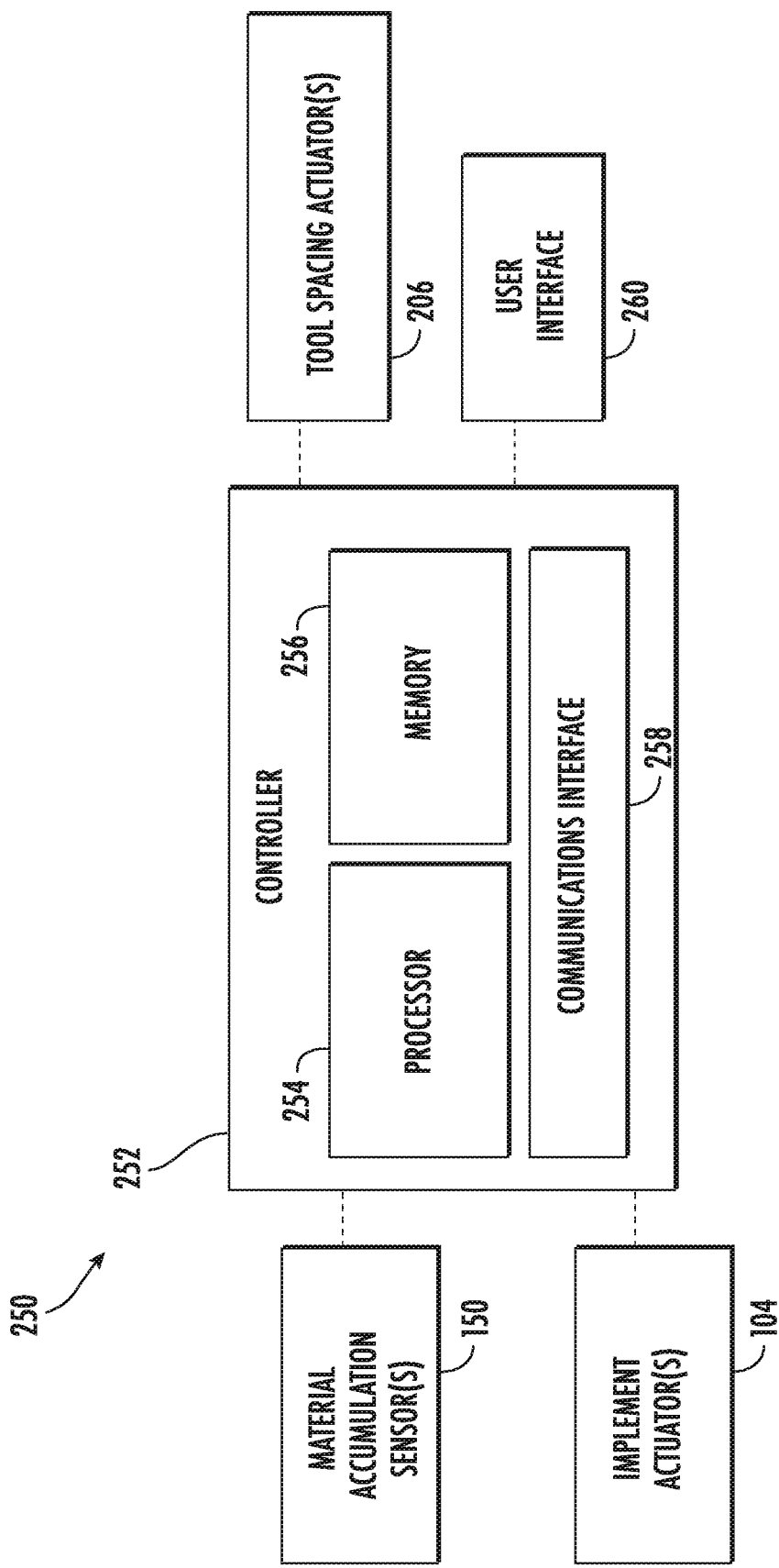
FIG. 7 illustrates a schematic view of one embodiment of a system for adjusting the spacing between ground engaging tools of a ground engaging assembly of an agricultural implement in accordance with aspects of the present subject matter.

Referring now to FIG. 7, a schematic view of one embodiment of a system 250 for adjusting the spacing between ground engaging tools of an agricultural implement is illustrated in accordance with aspects of the present subject matter. In general, the system 250 will be described herein with reference to the implement 10 described above with reference to FIGS. 1-2 and the system 202, 202' described above with reference to FIGS. 3-6. However, it should be appreciated by those of ordinary skill in the art that the disclosed system 250 may generally be utilized with agricultural implements having any other suitable implement configuration and/or with ground engaging assemblies/tools having any other suitable assembly/tool configuration.

As shown in FIG. 7, the system 250 may include the controller 252 configured to electronically control the operation of one or more components of the agricultural implement 10. In general, the controller 252 may comprise any suitable processor-based device known in the art, such as a computing device or any suitable combination of computing devices. Thus, in several embodiments, the controller 252 may include one or more processor(s) 254, and associated memory device(s) 256 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 256 of the controller 252 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 256 may generally be configured to store suitable computer-readable instructions that, when implemented by the processor(s) 254, configure the controller 252 to perform various computer-implemented functions, such as one or more aspects of the methods and algorithms that will be described herein. In addition, the controller 252 may also include various other suitable components, such as a communications circuit or module, one or more input/output channels, a data/control bus and/or the like.

In several embodiments, the controller 252 may correspond to an existing controller of the agricultural implement 10 and/or of the work vehicle 12 to which the implement 10 is coupled. However, it should be appreciated that, in other embodiments, the controller 252 may instead correspond to a separate processing device. For instance, in one embodiment, the controller 252 may form all or part of a separate plug-in module that may be installed within the agricultural implement 10 to allow for the disclosed system and method to be implemented without requiring additional software to be uploaded onto existing control devices of the agricultural implement 10.

In some embodiments, the controller 252 may be configured to include a communications module or interface 258 to allow for the controller 252 to communicate with any of the various other system components described herein. For instance, as described above, the controller 252 may, in several embodiments, be configured to receive data inputs from one or more sensors of the agricultural implement 10 that are used to detect one or more parameters associated with material accumulation relative to the associated ground engaging assembly, particularly between a pair of adjacent ground engaging tools of the associated ground engaging assembly. For instance, the controller 252 may be communicatively coupled to one or more material accumulation sensors 150 via any suitable connection, such as a wired or wireless connection, to allow data indicative of material accumulation between the adjacent ground engaging tools to be transmitted from the sensor(s) 150 to the controller 252. Further, the controller 252 may, in some embodiments, be communicatively coupled to one or more components of the implement 10, such as the implement actuator(s) 104, the tool spacing actuator 206, and/or the user interface 260, to allow the controller 252 to control such components.

The controller may be configured to perform one or more implement-related control actions based on an input associated with adjusting the spacing between tools of the ground engaging assembly, for example, based on the data received from one or more sensors associated with the implement 10 or an input via the user interface 260. Specifically, the controller 252 may be configured to control one or more components of the agricultural implement 10 based on the inputs. For example, as shown in FIG. 7, the controller 252 may be configured to control the operation of the tool spacing actuator 206 to actuate the first end disk 46A relative to the second end disk 46B from its minimum spacing position towards its maximum spacing position to adjust the disk gang width W, and thus the inter-disk spacing X between the disk blades 46, upon receipt of an input associated with adjusting the inter-disk spacing X between the disk blades 46. The controller 252 may alternatively or additionally be configured to control the tool spacing actuator 206 to actuate the first end disk 46A relative to the second end disk 46B back towards its minimum spacing position from its maximum spacing position based on the received input.

Specifically, referring back to FIGS. 3-6, in one embodiment, the input may be received from one or more material accumulation sensors 150 associated with the ground engaging assembly (e.g., disk gang 44) and configured to capture data indicative of material accumulation relative to adjacent ground engaging tools (e.g., ganged disks 46) of the implement 10. Thus, in several embodiments, the controller 252 may be configured to determine the presence of material accumulation relative to the ground engaging tools based on the data received from the material accumulation sensor(s) 150. For example, the controller 252 may include one or more suitable algorithms stored within its memory 256 that, when executed by the processor 254, allow the controller 252 to infer or estimate the presence of material accumulation relative to the ground engaging tools based on the data received from the material accumulation sensor(s) 150. Alternatively, the controller 252 may be configured to receive an input indicative of such material accumulation from an operator of the implement 10 via the user interface 260.

In such embodiment, the controller 252 may be configured to control the operation of the tool spacing actuator 206 to actuate the first end disk 46A relative to the second end disk 46B from its minimum spacing position to its maximum spacing position to adjust the disk gang width W. and thus the inter-disk spacing X between the disk blades 46, upon the determination of material accumulation. Generally, as indicated above, by adjusting the inter-disk spacing X, either by increasing or decreasing the inter-disk spacing X, the material accumulation formed relative to the ground engaging tools may be reduced.

Further, in some embodiments, the controller 252 may be configured to control the disk gang actuator(s) 104 associated with the disk gang 44 based on the input associated with adjusting the spacing between the tools of the ground engaging assembly. For instance, the controller 252 may be configured to control the down force on the disk gang 44 to adjust a penetration depth of the disk blades 46 of the disk gang 44. In some embodiments, for example, the controller 252 may be configured to reduce the down force on the disk gang 44, such that the penetration depth of the disk blades 46 is shallower upon determination of the plugging condition to reduce the necessary actuation force of the tool spacing actuator 206 for actuating the first end disk 46A from its minimum spacing position to its maximum spacing position, and may return the disk gang 44 to its normal working penetration depth after the actuation of the tool spacing actuator 206.

Moreover, in some embodiments, the controller 252 may be configured to indicate to an operator the operating conditions of the ground engaging tools, such as a current spacing between the ground engaging tools, the field conditions, and/or recommended control actions. For example, in the embodiment shown in FIG. 7, the communications module 258 may allow the controller 252 to communicate with a user interface 260 having a display device configured to display information to an operator. However, it should be appreciated that the controller 252 may instead be communicatively coupled to any number of other indicators, such as lights, alarms, and/or the like to indicate the operating conditions to the operator. In one embodiment, the controller 252 may generate a notification indicating to an operator a presence of material accumulation relative to the ground engaging tools (e.g., amount, frequency, duration, patterns, and/or the like).

Referring now to FIG. 8, a flow diagram of one embodiment of a method 300 for adjusting the spacing between ground engaging tools of an agricultural implement is illustrated in accordance with aspects of the present subject matter. In general, the method 300 will be described herein with reference to the implement 10 and the work vehicle 12 shown in FIGS. 1 and 2, the system 202, 202' shown in FIGS. 3-6, as well as the various system components shown in FIG. 7. However, it should be appreciated that the disclosed method 30 may be implemented with work vehicles and/or implements having any other suitable configurations and/or within systems having any other suitable system configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 8, at (302), the method 300 may include receiving an input associated with adjusting an inter-tool spacing defined between at least one pair of ground engaging tools of the plurality of ground engaging tools. For instance, as indicated above, the controller 252 may receive an input indicative of a request to adjust an inter-tool spacing, such as the inter-disk spacing X, between adjacent tools of a ground engaging assembly. In one embodiment, such input is received from a sensor, such as the material accumulation sensor 150, and/or from the operator via the user interface 260.

Additionally, as shown at (304), the method 300 may include adjusting a ground engaging width defined between first and second end tools of the plurality of ground engaging tools based on the received input such that the inter-tool spacing defined between each respective pair of adjacent tools of the plurality of ground engaging tools is varied at least in part by a biasing force of the plurality of biasing elements. For instance, as indicated above, the controller 252 may control the operation of the tool spacing actuator 206 to actuate the first end tool 46A between a minimum spacing position and a maximum spacing position relative to the second end tool 46B such that the biasing force of the biasing elements 204 increases or decreases the inter-disk spacing X between adjacent disks 46 of the disk gang 44. As indicated above, the actuator 206 may either directly actuate the first end tool 46A or may indirectly actuate the first end tool 46A, for example, by expanding or compressing the end biasing element 208 provided in association with the first end tool 46A.

Referring now to FIG. 9, a flow diagram of one embodiment of a method 400 for managing material accumulation relative to ground engaging tools of an agricultural implement is illustrated in accordance with aspects of the present subject matter. In general, the method 400 will be described herein with reference to the implement 10 and the work vehicle 12 shown in FIGS. 1 and 2, the system 202, 202' shown in FIGS. 3-6, as well as the various system components shown in FIG. 7. However, it should be appreciated that the disclosed method 400 may be implemented with work vehicles and/or implements having any other suitable configurations and/or within systems having any other suitable system configuration. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 9, at (402), the method 400 may include receiving an input associated with material accumulation relative to a plurality of ground engaging tools. For instance, as indicated above, the controller 252 may receive an input indicative of material accumulation relative to the disk blades 46 of the disk gang 44, such as by receiving an input from the material accumulation sensor 150 and/or from the operator via the user interface 260.

Additionally, as shown at (404), the method 400 may include adjusting a ground engaging width defined between first and second end tools of the plurality of ground engaging tools based on the received input such that the inter-tool spacing defined between each respective pair of adjacent tools of the plurality of ground engaging tools is varied at least in part by a biasing force of the plurality of biasing elements. For instance, as indicated above, the controller 252 may control the operation of the tool spacing actuator 206 to actuate the first end tool 46A between a minimum spacing position and a maximum spacing position relative to the second end tool 46B such that the biasing force of the plurality of biasing elements 204 increases or decreases the inter-disk spacing X between adjacent disks 46 of the disk gang 44, which helps to manage the material accumulation formed relative thereto. Particularly, such adjustment of the inter-disk spacing X helps to reduce an amount of material accumulation relative to at least one pair of disk blades 46 of the plurality of disk blades 46.

It is to be understood that the steps of the methods 300, 400 are performed by the controller 252 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the controller 252 described herein, such as the methods 300, 400, is implemented in software code or instructions which are tangibly stored on a tangible computer readable medium. The controller 252 loads the software code or instructions via a direct interface with the computer readable medium or via a wired and/or wireless network. Upon loading and executing such software code or instructions by the controller 252, the controller 252 may perform any of the functionality of the controller 252 described herein, including any steps of the methods 300, 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for adjusting the spacing between ground engaging tools of an agricultural implement, the system comprising:

a plurality of ground engaging tools configured to rotate relative to and engage soil within a field as an agricultural implement is moved across the field, the plurality of ground engaging tools including a first end tool, a second end tool, and at least one intermediate tool positioned between the first and second end tools, an adjustable ground engaging width being defined between the first and second end tools;

a plurality of biasing elements, each biasing element of the plurality of biasing elements being positioned between a respective pair of adjacent tools of the plurality of ground engaging tools, each biasing element being configured to apply a biasing force against its respective pair of adjacent tools such that an inter-tool spacing between each respective pair of adjacent tools is maintained substantially uniform across the plurality of ground engaging tools as the ground engaging width is adjusted;

an actuator configured to actuate the first end tool relative to the second end tool between a first tool position and a second tool position; and a controller configured to receive an accumulation input indicative of excessive material accumulation relative to at least one adjacent pair of ground engaging tools of the plurality of ground engaging tools and to adjust the ground engaging width in response to receiving the accumulation input, the controller being configured to adjust the ground engaging width by controlling an operation of the actuator to actuate the first end tool between the first and second tool positions.

2. The system of claim 1, wherein the actuator is coupled to the first end tool such that the actuator is configured to directly actuate the first end tool relative to the second end tool.

3. The system of claim 1, wherein the plurality of ground engaging tools are movably coupled to a rotating shaft extending between a first shaft end and a second shaft end, the first end tool being closest to the first shaft end, the system further comprising an end biasing element positioned between the first shaft end and the first end tool and configured to apply a biasing force against the first end tool.

4. The system of claim 3, wherein the actuator is configured to actuate the first end tool relative to the second end tool by compressing or expanding the end biasing element.

5. The system of claim 1, wherein the plurality of ground engaging tools are movably coupled to a rotating shaft, the system further comprising a spacing element supported on the rotating shaft between each respective pair of adjacent tools, each spacing element defining a minimum inter-tool spacing between each respective pair of adjacent tools, each biasing element being positioned radially between the associated spacing element and the rotating shaft.

6. The system of claim 1, wherein the inter-tool spacing increases when the first end tool is moved from the first tool position to the second tool position.

7. The system of claim 1, wherein the actuator comprises a hydraulic actuator, the controller configured to regulate a supply of fluid to the hydraulic actuator to adjust the ground engaging width.

8. The system of claim 1, wherein each biasing element comprises one of a helical spring or a compressible material.

9. An agricultural implement, comprising
a frame member;
a rotating shaft supported relative to the frame member;
a plurality of disks ganged on the rotating shaft, the plurality of disks being configured to rotate relative to and engage soil within a field as the agricultural implement is moved across the field, the plurality of disks including a first end disk, a second end disk, and at least one intermediate disk positioned axially between the first and second end disks, an adjustable disk gang width being defined between the first and second end disks;
a plurality of biasing elements, each biasing element of the plurality of biasing elements being positioned between a respective pair of adjacent disks of the plurality of disks, each biasing element being configured to apply a biasing force against its respective pair of adjacent disks such that an inter-disk spacing defined between each respective pair of adjacent disks is maintained substantially uniform across the plurality of disks as the disk gang width is adjusted; and
a spacing element supported on the rotating shaft between each pair of adjacent disks, each spacing element defining a minimum inter-disk spacing between each pair of adjacent disks, each biasing element being positioned radially between the associated spacing element and the rotating shaft.

10. The implement of claim 9, further comprising an actuator configured to actuate the first end disk relative to the second end disk.

11. The implement of claim 10, wherein the actuator is coupled to the first end disk such that the actuator is configured to directly actuate the first end disk relative to the second end disk.

12. The implement of claim 10, further comprising a controller configured to control an operation of the actuator to adjust the disk gang width.

13. The implement of claim 12, wherein the controller is further configured to receive an accumulation input indicative of excessive material accumulation relative to at least one pair of disks of the plurality of disks, the controller being configured to control the operation of the actuator upon receipt of the accumulation input to actuate the first end disk to adjust the disk gang width.

14. The implement of claim 10, wherein the rotating shaft extends between a first shaft end and a second shaft end, the first end disk being positioned closest to the first shaft end, the implement further comprising an end biasing element configured to apply a biasing force against the first end disk, the actuator being configured to compress or expand the end biasing element to actuate the first end disk relative to the second end disk.

15. A method for adjusting the spacing between ground engaging tools of an agricultural implement, the agricultural implement comprising a plurality of ground engaging tools including a first end tool, a second end tool, and at least one intermediate tool positioned between the first and second end tools, the agricultural implement further comprising a plurality of biasing elements, each biasing element of the plurality of biasing elements being positioned between and configured to apply a biasing force against a respective pair of adjacent ground engaging tools of the plurality of ground engaging tools, the method comprising:
receiving, with a computing device, an accumulation input indicative of excessive material accumulation relative to at least one adjacent pair of ground engaging tools of the plurality of ground engaging tools; and
controlling, with the computing device, an operation of an actuator based at least in part on the accumulation input to actuate the first end tool relative to the second end tool to adjust a ground engaging width defined between the first and second end tools such that an inter-tool spacing defined between each respective pair of adjacent tools of the plurality of ground engaging tools is varied at least in part by the biasing force of the plurality of biasing elements.

16. The method of claim 15, wherein the actuator is coupled to the first end tool, wherein controlling the operation of the actuator comprises controlling the operation of the actuator to directly actuate the first end tool relative to the second end tool.

17. The method of claim 15, wherein controlling the operation of the actuator comprises controlling the operation of the actuator to compress or expand an end biasing element, the end biasing element being configured to apply a biasing force against the first end tool.

* * * * *